(12) United States Patent
Webster et al.

(10) Patent No.: US 10,414,922 B2
(45) Date of Patent: Sep. 17, 2019

(54) EC PRIMER COATING FOR PAPER AND PAPERBOARD

(71) Applicant: SUN CHEMICAL CORPORATION, Parsippany, NJ (US)

(72) Inventors: Glenn Webster, Geneva, IL (US); Horace Singleton, Skokie, IL (US); Steve Standing, Orpington (GB); Dana Mohr, Disputanta, VA (US); Philippe Schottland, Sparta, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 347 days.

(21) Appl. No.: 14/760,380

(22) PCT Filed: Jan. 15, 2014

(86) PCT No.: PCT/US2014/011601
§ 371 (c)(1),
(2) Date: Jul. 10, 2015

(87) PCT Pub. No.: WO2014/113425
PCT Pub. Date: Jul. 24, 2014

(65) Prior Publication Data
US 2015/0353739 A1    Dec. 10, 2015

Related U.S. Application Data

(60) Provisional application No. 61/753,576, filed on Jan. 17, 2013.

(51) Int. Cl.
*C09D 5/00* (2006.01)
*C08J 5/00* (2006.01)
(Continued)

(52) U.S. Cl.
CPC ............... *C09D 5/002* (2013.01); *C08J 5/00* (2013.01); *C09D 11/037* (2013.01);
(Continued)

(58) Field of Classification Search
CPC .... C09D 5/002; C09D 11/101; C08J 2335/02; D21H 19/16; D21H 19/20
See application file for complete search history.

(56) References Cited

U.S. PATENT DOCUMENTS 6,054,170 A    4/2000   Chess et al.
6,409,821 B1   6/2002   Cassar et al.
(Continued)

FOREIGN PATENT DOCUMENTS

EP    2682272 A1     1/2014
JP    A-H03-243669   10/1991
(Continued)

OTHER PUBLICATIONS

Kiatkamjornwong, Suda, and Suteera Tessiri. "Synthesis and characterization of poly [(methyl methacrylate)-co-(methacrylic acid)] for a UV-sensitive aqueous base developable lithographic plate." Journal of applied polymer science 86.8 (2002): 1829-1837.*
(Continued)

*Primary Examiner* — Nicholas E Hill
(74) *Attorney, Agent, or Firm* — Charles C. Achkar; Ostrolenk Faber LLP

(57) ABSTRACT

Disclosed are energy curable primer compositions for use on uneven substrates such as paper or board to help create a non-porous, smooth, print-receptive surface for subsequent in-line or off-line application of metallic or special effect inks for generating a superior appearance such as a mirror-like metallic or other special effect for promotional or high-value packaging applications. Compositions suitable for low odor and low migration indirect contact food,
(Continued)

tobacco, or pharmaceutical product packaging are also disclosed.

3 Claims, 1 Drawing Sheet

(51) Int. Cl.
    *C09D 133/14* (2006.01)
    *D21H 19/20* (2006.01)
    *C09D 11/101* (2014.01)
    *D21H 19/02* (2006.01)
    *D21H 19/16* (2006.01)
    *D21H 19/22* (2006.01)
    *C09D 11/037* (2014.01)
    *B05D 5/06* (2006.01)

(52) U.S. Cl.
    CPC .......... *C09D 11/101* (2013.01); *C09D 133/14* (2013.01); *D21H 19/02* (2013.01); *D21H 19/16* (2013.01); *D21H 19/20* (2013.01); *D21H 19/22* (2013.01); *B05D 5/067* (2013.01); *B05D 2203/22* (2013.01); *C08J 2335/02* (2013.01); *Y10T 428/24802* (2015.01); *Y10T 428/24917* (2015.01)

(56) References Cited

U.S. PATENT DOCUMENTS

| | | | |
|---|---|---|---|
| 6,913,639 | B2 | 7/2005 | Wang et al. |
| 7,416,774 | B2 | 8/2008 | Ueda et al. |
| 8,153,195 | B2 | 4/2012 | Tennis et al. |
| 8,235,517 | B2 | 8/2012 | Grant et al. |
| 2003/0021961 | A1 | 1/2003 | Ylitalo et al. |
| 2005/0208423 | A1* | 9/2005 | Mitsumoto ............ B41C 1/1008 430/270.1 |
| 2005/0271850 | A1 | 12/2005 | Fagan et al. |
| 2007/0076069 | A1 | 4/2007 | Edwards et al. |
| 2011/0060069 | A1* | 3/2011 | Arora ................... C09D 11/101 522/64 |
| 2011/0298207 | A1 | 12/2011 | Despland et al. |
| 2012/0205426 | A1 | 8/2012 | Neary |

FOREIGN PATENT DOCUMENTS

| | | | |
|---|---|---|---|
| JP | A-H04-322251 | 11/1992 | |
| JP | A-H07-300794 | 11/1995 | |
| JP | A-H09-059894 | 3/1997 | |
| JP | A-H09-250097 | 9/1997 | |
| JP | A-2002-347175 | 12/2002 | |
| JP | A-2005-205258 | 8/2005 | |
| WO | WO-02081576 A1 * | 10/2002 | ............ C08F 290/04 |
| WO | WO 2009/062867 A1 | 5/2009 | |

OTHER PUBLICATIONS

European Search Report issued in European Application No. 14740854.6, dated Aug. 3, 2016.
International Preliminary Report Issued in PCT/US2014/011601, dated Jul. 30, 2015.
International Search Report issued in PCT/US2014/11601, dated May 6, 2014.
Office Action issued in corresponding Japanese Application No. 2015-553791, dated Dec. 19, 2017.
Office Action issued in European Counterpart Application 14 740 854.6 dated Feb. 14, 2018.
Chinese Office Action and English translation thereof, issued in counterpart Chinese application No. 201480003784.1 dated Aug. 1, 2018.
Malaysian Office Action issued in counterpart Malaysian application No. PI 2015001689 dated Sep. 14, 2018.
European Office Action issued in counterpart European application No. 14740854.6 dated Sep. 25, 2018.
Office Action issued in Chinese Counterpart Application 2015-553791 dated Nov. 5, 2018.
Office Action issued in Chinese Counterpart Application 201480003784.1 dated Dec. 7, 2018.
Dictionary of Motorcycle Technology, Huaxin Chen et al., Fujian Science and Technology Press, p. 781; Jun. 30, 2000.
Dictionary of Chemicals, Shichang Ma, Shanxi Science and Technology Press, p. 480; Apr. 30, 1999.
Coatings Inks, Min Gu et al., China Petrochemical Press, p. 229; Jan. 31, 2009.

* cited by examiner

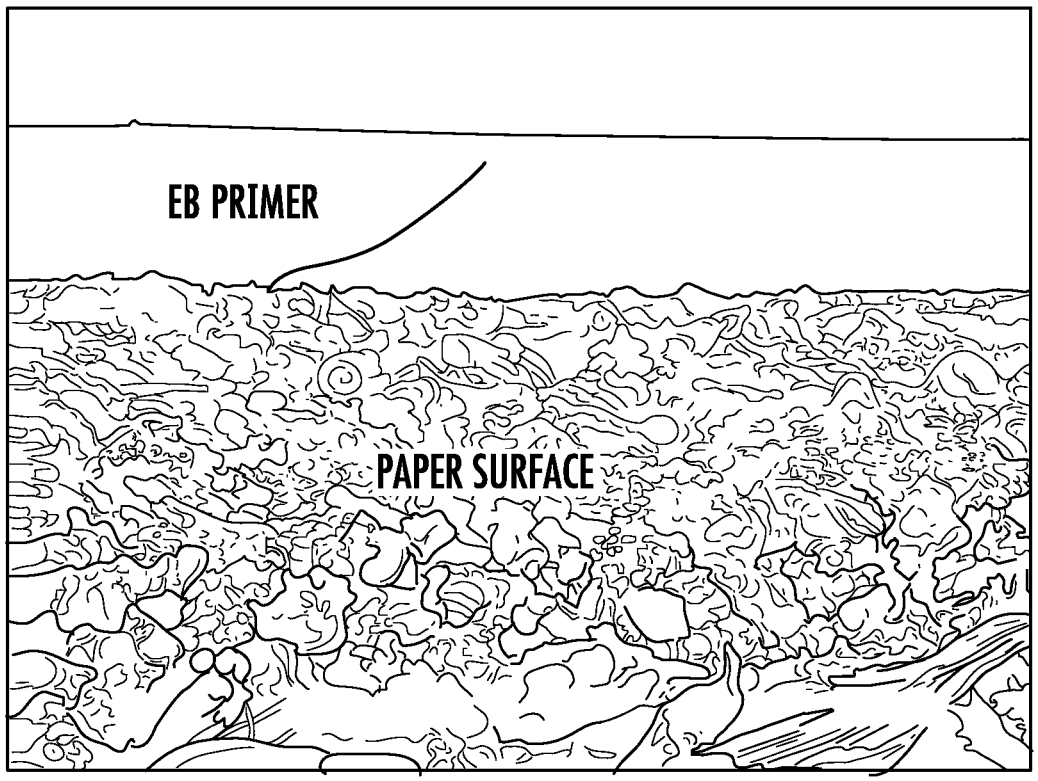

EC PRIMER COATING FOR PAPER AND PAPERBOARD

CROSS REFERENCE TO RELATED APPLICATIONS

The present application is a § 371 National Phase application based on PCT/US2014/011601 filed Jan. 15, 2014, which claims the benefit of U.S. Provisional Application Ser. No. 61/753,576, filed Jan. 17, 2013. All the applications are incorporated herein by reference in the entirety and for all purposes.

FIELD OF THE INVENTION

The present invention relates to energy curable primer compositions that show over-printability and interlayer adhesion with inks or overprint lacquers as well as flexibility for use in packaging.

BACKGROUND OF THE INVENTION

Special effects such as highly reflective metallic-effect packaging is often used in retail and promotional packaging designs to promote, attract and draw increased customer attention and thereby increase sales and services of packaged products. Toward this end, traditional printing methods may utilize a pre-processed metallic foil or metalized film laminated to paper or paperboard substrate such as used to produce folding carton boxes for goods. In this method, the metallic substrate is relatively expensive compared to standard quality white paper or paperboard used for printing standard quality graphic designs for folding carton packaging. In addition, metallic foil or metalized film laminated paper or paperboard is typically overprinted over a significant surface area with opaque white ink covering the metallic effect, to provide sufficient area of a neutral white base-coat for colored graphics to be printed, while leaving less than 100% of the metallic surface uncovered to create the intended visible metallic effect.

In a more efficient approach, packaging requiring a metallic effect can be printed only in the required regions on standard quality white coated paper or paperboard using a metallic effect printing ink. Low viscosity liquid printing inks applied onto porous and non-smooth substrates penetrate and soak into the porous substrate, and/or dry in a non-smooth layer following the non-smooth surface contours of the substrate, resulting in a visible and measurably low-reflectivity, non-aesthetically pleasing metallic appearance compared to the high reflective qualities of metallic foil or metalized film. The use of primers is typically recommended in order to help improve the metallic appearance.

Although the concept of using a primer to improve the surface of a substrate before applying an ink is not new, there is very limited prior art related to energy curable primers that are effective at improving metallic appearance. A recent patent application from Shorewood Packaging/International Paper (WO2012099698) discloses a method to produce a package with a metallic appearance including applying an energy curable primer and a metallic ink. However, there is no information provided regarding the composition of suitable primers that will enable the creation of packages having the desired metallic appearance to replace foil stamping or use of fully metalized board such as board laminated with a metalized film ("Met-Pol" board) or board laminated with a thin aluminum foil ("Transmet" board).

Achieving superior reflectivity and brilliance index requires special primer characteristics which are not disclosed by Shorewood. In addition, metallization primers disclosed in the prior art, such as the clear undercoat primer from Jetrion disclosed in US2007/076069 and U.S. Pat. No. 7,891,799, do not provide the same level of temperature dependency of the viscosity exhibited by the primers of the present invention. This particular rheological behavior in the primers of the present invention brings superior leveling capability at application temperature with reduced board penetration. As a result, the primer has superior gloss retention over a large range of anilox volume (which relates to applied coating weight) going from 15 bcm (billion cubic microns/in$^2$) to 10 bcm and 5 bcm. The primers of the present invention preferably have a viscosity reduction % of over 55% between 25° C. and 45° C. whereas the prior art primer typically shows about 27%.

In addition, primers from the prior art are very sensitive to the surface they are printed onto as illustrated in the gloss differences on BYK Penopac charts between the primer on the white coated part of the chart compared with the white uncoated part of the chart. That sensitivity is further increased with lower anilox volumes as seen illustrated in Example 2 below.

Accordingly, the prior art also fails to disclose primer formulations which would be suitable for use in packaging where organoleptic characteristics such as odor and migration are important (e.g. food, tobacco, and pharmaceutical packaging). By selecting acrylate monomers and oligomers having certain properties and/or with a MW of preferably at least 300 g/mol in combination with appropriate additives and, if applicable, photoinitiator package, one can produce an effective metallization primer with low odor and low set-off migration characteristics (per testing from EU directive No. 10/2011).

SUMMARY OF THE INVENTION

The present invention provides a primer composition comprising:
  (a) an acrylic monomer comprising C—O—C and C═C functional groups; and
  (b) an acrylic oligomer comprising C—O—C and C═C functional groups,
  wherein said primer composition is energy curable and the calculated ratio of C—O—C to C═C functionality in the sum of the acrylic monomer and acrylic oligomer is greater than 1.6.

The present invention also provides a printed article comprising the primer composition of the present invention.

The present invention further provides a method of printing an energy curable primer composition comprising applying to a substrate the primer composition of the present invention.

The present invention also provides a method for forming a brilliant metallic coated paper material comprising:
  (a) applying a layer of the primer composition of the present invention to a paper surface of the paper material;
  (b) curing the layer of the primer to create an ink receptive interface layer;
  (c) applying a reflective metallic ink including a plurality of reflective particles to at least a portion of the cured primer layer; and
  (d) drying the metallic ink to form a reflective metallic ink layer on the cured primer.

These and other objects, advantages, and features of the invention will become apparent to those persons skilled in the art upon reading the details of the methods and formulations as more fully described below.

BRIEF DESCRIPTION OF THE DRAWING

FIG. 1 shows a SEM cross-section of a Leneta chart coated with the cured Example 1 primer using a 15 bcm anilox and overprinted with metallic VMP ink SC17604. The image shows the smooth and uniform layer created by the primer with a thickness of about 4.5 microns on top of the board and how the surface is improved compared with the board surface itself.

DETAILED DESCRIPTION OF THE INVENTION

The present invention describes energy curable primer compositions for use on uneven substrates such as paper or board to help create a non-porous, smooth, print-receptive surface for subsequent in-line or off-line application of metallic or special effect inks for generating a superior appearance such as a mirror-like metallic or other special effect for promotional or high-value packaging applications. Compositions suitable for low odor and low migration indirect contact food, tobacco, or pharmaceutical product packaging are also disclosed.

The liquid primer compositions of the present invention are energy curable (UV or E-Beam), can be applied substantially solvent-free (<500 ppm), or with evaporative drying/UV or E-Beam curing if diluted using solvent or water, and are preferably formulated at gravure or flexo printing application viscosity for curing by free radical polymerization initiated by an electron beam or suitable actinic radiation with or without the use of nitrogen-inerted atmosphere conditions. While the compositions are preferably applied by flexo or gravure processes, it is understood that the compositions could also be modified to make them suitable for use in other deposition methods (e.g. spray coating, ink jet, lithographic, roll coating, curtain coating, etc.). With a preferred low surface tension, the liquid primers exhibit good wetting characteristics over paper or board substrates. The cured primer-coated substrate may be further processed in-line on subsequent printing stations, or stored, or processed downstream or off-line, depending on application and operational needs of the printer-converter. The primers preferably show excellent over-printability and interlayer adhesion with inks or overprint lacquers as well as flexibility for use in packaging.

Compared to prior art, in certain types of primers requiring a lower viscosity formulation, for example flexo- and gravure-applied primers formulations, the compositions of the present invention preferably exhibit a much larger viscosity reduction as temperature increases (typically greater than 50% drop in viscosity between 25° C. and 45° C. compared to less than 30% for the prior art). Such rheological behavior allows for primers to optionally be applied at an elevated temperature, provide excellent printing and leveling while at elevated temperature while having limited penetration into the board. Such behavior is also illustrated by the more robust gloss retention performance of the primers at different coating film weights compared to the prior art formulations. In one embodiment, the compositions have also shown limited gloss differences when printed over a coated portion of a BYK Penopac chart or an uncoated BYK Penopac chart. Such characteristics may result in improved primer transfer efficiency during printing.

Effective primer compositions compatible with use in packaging applications where organoleptic aspects such as odor and taste are important (e.g., food or tobacco packaging) are also presented. When cured in a commercially printed packaging structure (e.g. those comprising paper or paperboard substrate+primer+suitable metallic or colored inks+suitable overprint varnish or lacquer), the set-off migration measured is preferably less than their specific migration limit (SML) or less than 10 ppb for residual components without SML, thus ensuring compliance with European Food Safety regulations per EU directive No. 10/2011.

The ability to spot-apply a UV or EB curable primer coating onto a standard quality paper or paperboard, followed by a highly reflective metallic ink, only where it is required by the graphic design, allows for more efficient packaging designs and improved yield and process efficiencies to printer-converters over comparable packaging produced using traditional metalized laminated paper or paperboard substrates having 100% coverage of a metallic foil or a metalized film layer, which are typically partially overprinted with white ink and colored inks in order to create the full range of required commercial graphics. It also allows similar advantages over other comparable metallic graphic effects produced by metallic hot or cold foil stamping onto printed materials.

The primers of the present invention provide higher gloss at lower film weight and are more robust to differences in substrate porosity. This allows converters to make a more efficient use of the primer (better mileage without significant loss in gloss) and adapt more easily to changes in board porosity or surface energy. Also, the preferred high dispersive surface energy of the cured primer makes it an excellent surface for overprinting with solvent based inks (such as colored or special effect inks) to create more appealing graphics and therefore help converters/brand owners create packages or labels with more shelf appeal.

UV or EB curable coatings with viscosity low enough to be suitable for flexo or gravure applied coating typically contain low molecular weight, low viscosity, mono-, di or tri-acrylate monomers such as 1,6-Hexanediol diacrylate, Dipropyleneglycol diacrylate, Tripropyleneglycol diacrylate, Trimethylolpropane triacrylate, or similar type, leading to a high residual cured odor and significant residual migratable components from cured films, making them unsuitable for food or tobacco packaging applications. Alternative, more acceptable acrylate monomers and oligomers are frequently too viscous to formulate into gravure applied coatings. Dilution of acrylate functionality with water, solvent, or plasticizer to achieve an acceptable viscosity can lead to a reduction in efficiency or speed of curing, loss of cured film toughness or durability, surface defects such as pinholes or craters, or retention of undesirable solvent in the cured film. The use of surface tension lowering surface active agents such as polydimethylsiloxanes, silicone oils, or other surfactants to eliminate surface defects in primer coatings also reduces the surface energy of the cured primer film below that of other inks intended to print on top of the primer, producing poor ink transfer and poor interfilm adhesion between inks and primer. To achieve efficient ink transfer from the printing medium, whether it is an engraved cylinder or a processed plate, to the substrate, the surface energy of the solid substrate is preferably higher than the surface tension of the liquid ink being transferred onto it in order for the ink to wet and spread onto the surface. In the case of primer-coated paper or paperboard, the cured primer film is the substrate for the next applied ink to wet and transfer onto.

The present invention discloses that certain parameters are preferred in the selection of the best energy curable primers for porous uneven substrates such as paper and board. These parameters are even more preferred in the case of gravure printable primers, where viscosity is typically lower than with flexo primers, which increases the potential risks of the primer penetrating into the board and therefore producing a less attractive finish.

In one embodiment, the current invention also introduces gravure printable primers with a viscosity at 45° C. between 17 and 25 cPs measured at 10 reciprocal seconds ($sec^{-1}$) with a coaxial cylinder (Couette) geometry on a TA Instruments AR-1500 rheometer using inner cylinder diameter 28 millimeters and outer cylinder diameter 30 millimeters and 1 millimeter gap. The viscosity reduction between 25° C. and 45° C. of these formulations preferably exceeds 55%.

In another embodiment, the ratio of C—O—C to C═C functionality in the monomer and oligomer fraction of the primer formulation is >1.6 meq/g and preferably >1.8 compared to 1.5 for the prior art formula. This ratio relates to a higher degree of alkoxy functionalities in the coating which is associated with a lower static surface tension for the coating (≤33 mN/m) which further helps wetting onto the substrate.

In a preferred embodiment, the liquid static surface tension of the UV or EB primer is ≤33 mN/m at 20° C., measured using a Cahn DCA-312 tensiometer; Wilhelmy plate technique using glass plate 25×25 mm, ~0.1 mm thick, temperature 20° C.; and the cured primer film has a dispersive surface energy >34 mN/m and preferably ≥37 mN/m.

In yet another embodiment, the current invention disclosure also introduces gravure printable primers with a viscosity at application temperature ranging between 15 and 65 cPs and preferably between 17 and 25 cPs measured at 45° C., and a viscosity reduction factor between 25° C. and 45° C. greater than or equal to 50%. In a preferred embodiment, the primer will have a viscosity at 45° C. between 17 and 25 cPs measured at 10 reciprocal seconds ($sec^{-1}$) with a coaxial cylinder (Couette) geometry on a TA Instruments AR-1500 rheometer using inner cylinder diameter 28 millimeters and outer cylinder diameter 30 millimeters and 1 millimeter gap.

In applications where organoleptic characteristics such as odor and smell are important like food or tobacco packaging, the monomers are preferably selected with a MW of preferably at least 300 g/mol in combination with approved additives and, if applicable, photoinitiator packages, in order to produce an effective metallization primer with low odor and low set-off migration characteristics (per testing according to EU directive No. 10/2011).

The liquid primers of the present invention are preferably formulated such that they may be cured using actinic radiation e.g. UV in air or when inerted with nitrogen or other gas to displace and reduce atmospheric oxygen concentration, or EB preferably in conditions where oxygen concentration does not exceed 200 ppm, to yield a cured dry, overprintable film preferably having the following characteristics on Leneta N2A-3 charts when printed using a TMI Flexiproofer with a 15 bcm anilox.

Total surface energy after curing is preferably ≥37 mN/m as measured using contact angle measurements of probe liquids (water and di-iodomethane) using a Fribro 1100 DAT instrument. Dispersive and Polar components were calculated by splitting the total surface energy using Fowkes' theory geometric mean approach.

Also preferably, gloss after cure at 20° angle is >55 and Gloss at 60° angle is >83 as measured using a BYK-Gardner micro-TRI-gloss meter.

Once overprinted with a suitable silver metallic ink (e.g. Sun Chemical SC17604 MIRRORTECH® S) and applied with a #3 Meyer wire-wound coating bar, primed metalized surfaces will preferably exhibit a total visible light reflectance greater than or equal to 64 with a brilliance index equal to or greater than 86%.

The primer compositions of the present invention are preferably designed for performance in gravure or flexo application without the need for addition or dilution with other materials or solvents.

The primer formulations are preferably essentially solvent-free (<500 ppm), include energy curable monomers and/or oligomers, optionally a photoinitiator package (which may include an amine synergist), optionally low levels of additives such as surfactants; flow/leveling agent and/or defoamer (preferably non-silicone). Optionally primer formulations may also include colorants, tinting packages, or visual effect pigments, to improve graphic reproduction or enhance visual impact of the graphic design.

The formulation components are selected such that: (a) the reduction in primer coating viscosity measured at 10 $sec^{-1}$ between 25° C. and 45° C. is equal to or greater than 50%; (b) the cured primer applied using a Flexiproofer with a 15 bcm anilox on Leneta N2A-3 chart has a total surface energy greater than or equal to 37 mN/m; and/or the gloss of the printed primer after cure at 20° angle is >55; and gloss at 60° angle is >83.

Selection of low viscosity monomer or oligomers with a higher molecular weight, low viscosity, and high surface tension are preferred for the correct gravure application viscosity, fast curing, optimum cured film surface energy, and low post-cure migration potential of residual components.

Selection of optimum surface active agents for control of primer-substrate wetting, flow and leveling, as well as antifoaming and defoaming capability, are preferred for a smooth and defect-free surface of the liquid primer as it is applied onto the paper or paperboard substrate, resulting in a preferred dispersive surface energy when cured >37 mN/m.

In another embodiment, the coating formulation and in particular the additive package is selected such that the cured coating exhibits superior gloss retention over a range of anilox volumes from 15 to 5 bcm when printed onto BYK Penopac 2817 charts. Superior gloss retention is defined as a gloss reduction of less than 10 points at a 60° angle and a gloss reduction of less than 20 points at a 20° angle when changing from 15 bcm to 5 bcm anilox. Examples of suitable additive package include polyacrylate flow and leveling promoters such as Tego Flow 425, Tego Flow 300, Tego Flow 370, Tego Wet 270, BYK 361 and BYK 3455.

In a further embodiment, the additive package is preferably selected to provide robust gloss performance over coated and uncoated board as illustrated by gloss differences between the cured coating over white coated area of the BYK Penopac 2817 chart compared with cured coating over the white uncoated area of the chart. Preferred compositions show at a 60° angle a gloss difference of less than 2 at 15 bcm and less than 4 at 10 bcm.

The effectiveness of the primer of the present invention was also demonstrated on thin coated paper (less than 70 gsm total) such as that used for beer labels. The primed papers were metalized with SC17604 and exhibited similar brilliance and metallic appearance comparable to beer labels prepared using vacuum metallization. Vacuum metallization is a technology which requires the label to be first primed before vacuum metallization then overprinted with a lacquer that provides a suitable print surface for printing inks which will ultimately be covered by a lacquer. With the primer of the present invention, the metallization primer is followed by the silver inks and directly printable with graphics and overprint varnish thus eliminating at least one layer of varnish and the associated waste of vacuum metallization.

The primers of the present invention can also be used to improve the surface characteristics of thermoplastic films or board with a coextruded plastic layer (such as PE) and therefore the appearance of graphics printed on top of the primer. Examples of such substrates include for example milk cartons which are traditionally difficult substrates to print with high quality. The primers of the present invention can also be used on other substrates such as polymeric types, cellulosic, wood, metal, etc.

The primers of the present invention may also include colorants. Suitable colorants include, but are not limited to organic or inorganic pigments and dyes. The dyes include but are not limited to azo dyes, anthraquinone dyes, xanthene dyes, azine dyes, combinations thereof and the like. The pigments include but are not limited to coated or uncoated mica or other inorganic metal oxides, pearlescent, opalescent, angle-dependent and other photonic pigments, carbon black, metal or metallic alloys such as aluminum or bronze, and organic pigments.

As with most coating compositions, additives may be incorporated to enhance various properties. A partial list of such additives includes but is not limited to adhesion promoters and cross-linkers such as amine or amino-functional compounds, organo-metallic compounds such as titanate, zirconate, phosphate, or other inorganic, or organic acid-functional compounds, light stabilizers, de-gassing additives, flow promoters, defoamers, antioxidants, UV stabilizers, surfactants, dispersants, plasticizers, rheological additives, waxes, silicones, other surface or interfacial modifiers, etc.

Although a solvent gravure-applied silver effect ink is used to generate metallic effects with the primer examples given, effective results can also be achieved using other printing application processes for the effect ink over the primer, including but not limited to waterbased, energy curable, flexo, gravure, inkjet, offset, and other commonly applied printing or coating methods.

The primer compositions of the present invention have demonstrated as shown below the ability to provide more brilliant metallic appearance compared to compositions known in the prior art. These rapid curing primer coatings on non-smooth and porous substrates allow a substrate surface to be modified, becoming a non-porous, level and glassy-smooth, print-receptive surface for application of a low viscosity liquid metallic effect ink that leads to ink drying with a near mirror-like surface appearance closely resembling the visual reflective effect of metal foil or metalized film. Substrates primed with these compositions may also be used for other applications where the primer can be overprinted with inks or other colored or special effect inks to provide a more vibrant visual effect or an overall improvement in gloss or graphics appearance.

The following examples illustrate specific aspects of the present invention and are not intended to limit the scope thereof in any respect and should not be so construed.

Examples 1-9

A series of EB and UV primer formulations were compared for gloss at 20° and 60°, and for Brilliance Index. Prints were made by first printing each of the primers using a TMI Flexiproofer with a 15 bcm anilox onto a Leneta N2A-3 chart, curing the primer, and then overprinting with SC17604 acetate solvent-based vacuum metalized pigment silver ink from Sun Chemical applied with a Meyer #3 bar on Leneta Form N2A-3 (over white board). Brilliance Index of Transmet and Metpol board reference standards was also measured.

TABLE 1*

Finished ink formulations.

| | Ex. 1 (Inventive) | Ex. 2 (Inventive) | Ex. 3 (Inventive) | Ex. 4 (Inventive) | Ex. 5 (Inventive) | Ex. 6 (Comparative) | Ex. 7 (Comparative) | Ex. 8 (Comparative) | Ex. 9 (Inventive) |
|---|---|---|---|---|---|---|---|---|---|
| 5EO-PETTA | | | | | | | | | 50.00% |
| 3EO-TMPTA | 74.30% | 74.30% | 74.30% | 54.10% | 54.10% | 50.00% | 45.80% | 45.10% | |
| GPTA | | | | | | | | | 20.70% |
| 2PO-NPGDA | | 25.00% | | | 25.00% | | | | |
| PEG200DA | 25.00% | | | 25.00% | | | | | |
| HDDA | | | | | | 38.00% | 34.00% | 34.00% | |
| TPGDA | | | 25.00% | | | | | | |
| DPGDA | | | | | | | | | |
| 2EO-BPADA | | | | | | | | | 10.00% |
| PHOTOMER 5006 | | | | 12.00% | 12.00% | | 12.00% | 12.00% | 10.00% |
| MDEA | | | | | | 4.00% | | | |
| OMNIPOL BP | | | | | | | | | 8.00% |
| EBECRYL P-39 | | | | 4.00% | 4.00% | | 4.00% | 4.00% | |
| IRGACURE 2959 | | | | 4.00% | 4.00% | | | | |
| ESACURE ONE | | | | | | | | | 1.00% |
| IRGACURE 184 | | | | | | 4.00% | 4.00% | 4.00% | |
| TPO | | | | | | 4.00% | | | |
| GENORAD 16 | | | | 0.20% | 0.20% | | 0.20% | 0.20% | 0.20% |
| TEGOFLOW 370 | 0.50% | 0.50% | 0.50% | 0.50% | 0.50% | | | 0.50% | |
| BYK A-535 | 0.20% | 0.20% | 0.20% | 0.20% | 0.20% | | | 0.20% | |
| UV Violet Toner | | | | | | | | | 0.10% |
| Total | 100.00% | 100.00% | 100.00% | 100.00% | 100.00% | 100.00% | 100.00% | 100.00% | 100.00% |

*Ex. 1 - EB Gravure Ink; Ex. 2 - EB Gravure Ink; Ex. 3 - EB Gravure Ink; Ex. 4 - UV Gravure Ink; Ex. 5 - UV Gravure Ink; Ex. 6 - UV Clear Undercoat from US2007/076069; Ex. 7 - UV Clear Undercoat from US2007/076069 + photoinitiators; Ex. 8 - UV Clear Undercoat from US2007/076069 + photoinitiators and flow additives; Ex. 9 - UV Flexo Ink.

TABLE 2

Ink & cured ink film properties.

|  | Ex. 1 (Inventive) | Ex. 2 (Inventive) | Ex. 3 (Inventive) | Ex. 4 (Inventive) | Ex. 5 (Inventive) | Ex. 6 (Comparative) | Ex. 7 (Comparative) | Ex. 8 (Comparative) | Ex. 9 (Inventive) |
|---|---|---|---|---|---|---|---|---|---|
| C—O—C meq/g | 16.2 | 13.5 | 14.3 | 14.5 | 11.7 | 10.4 |  |  | 12.8 |
| C=C meq/g | 6.9 | 6.7 | 7.1 | 5.6 | 5.5 | 6.9 |  |  | 5.6 |
| C=O meq/g | 6.9 | 7.5 | 7.1 | 6.0 | 6.6 | 6.9 |  |  | 5.9 |
| C—O—C/C=C ratio | 2.4 | 2.0 | 2.0 | 2.6 | 2.1 | 1.5 |  |  | 2.3 |
| Low Odor Formulation | Yes | Yes | No | Yes | Yes | No | No | No | Yes |
| TA Couette 25° C., cPs | 48.6 | 47.6 | 42.8 | 63.7 | 30.1 | 23.5 |  |  | 303 |
| TA Couette 45° C., cPs | 19.1 | 18.9 | 17.7 | 24.2 | 12.9 | 17.2 |  |  | 82.6 |
| Viscosity % drop 25-45° C. | 60.7% | 60.3% | 58.6% | 62.0% | 57.1% | 26.8% |  |  | 72.7% |
| Liquid SST 20° C., mN/m | 29.5 | 32.3 | 28 | 30.2 | 30.8 | 34.9 |  |  | 37.1 |
| Liquid DST 23° C., mN/m | 37.5 | 35.6 | 35.5 | 38.1 | 39.3 | 36.9 |  |  | 58.1 |
| Cured Dispersive, m/N/m | 37 | 38 | 38 | 42 | 42 | 42 |  |  | 43 |
| Cured Polar, mN/m | 7 | 7 | 9 | 3 | 4 | 4 |  |  | 7 |
| Cured Total, mN/m | 44 | 45 | 47 | 45 | 46 | 46 |  |  | 50 |
| Y-SCI | 69.37 | 69.02 | 69.03 | 64.59 | 58.86 | 62.82 |  |  | 65.35 |
| Brilliance Index w/ SC17604 Silver | 88.7% | 88.65% | 88.75% | 86.15% | 80.3% | 83.35% |  |  | 86.8% |
| Gloss 20° 15 BCM Anilox | 63.4 | 59.2 | 61.7 | 62.2 | 56.3 | 53.8 |  |  | 57.7 |
| Gloss 60° 15 BCM Anilox | 86.2 | 83.7 | 85.1 | 87.8 | 86 | 83.9 |  |  | 87.5 |
| COF Static | 0.459 | 0.446 | 0.561 | 0.354 | 0.312 | 0.398 |  |  | 0.473 |
| COF Kinetic | 0.365 | 0.366 | 0.466 | 0.312 | 0.265 | 0.316 |  |  | 0.38 |

^Note: adhesion and flexibility of all printed samples was found to be acceptable

TABLE 3

Chemical names and description of ingredients in Table 1.

| Material | Chemical Name/Description |
|---|---|
| 5EO-PETTA | Ethoxylated pentaerythritol tetra-acrylate |
| 3EO-TMPTA | Ethoxylated trimethylolpropane tri-acrylate |
| GPTA | Glycerol propoxy tri-acrylate |
| 2PO-NPGDA | Propoxylated neopentylglycol di-acrylate |
| PEG200DA | Polyethylenglycol (200) di-acrylate |
| HDDA | Hexanediol di-acrylate |
| TPGDA | Tripropyleneglycol di-acrylate |
| DPGDA | Dipropyleneglycol di-acrylate |
| 2EO-BPADA | Ethoxylated bisphenol-A di-acrylate |
| PHOTOMER 5006 | Amine mono-acrylate |
| MDEA | Methyldiethanolamine photosynergist |
| OMNIPOL BP | Oligomeric Benzophenone-PI |
| EBECRYL P-39 | Benzophenone derivative-PI |
| IRGACURE 2959 | **PI-4-(2-hydroxyethoxy)phenyl-(2-hydroxy-2-propyl)ketone |
| ESACURE ONE | PI-Oligo[2-hydroxy-2-methyl-1-[4-(1-methylvinyl)phenyl]propanone] |
| IRGACURE 184 | PI-1-Hydroxy-cyclohexyl-phenyl-ketone |
| TPO | PI-2,4,6-trimethylbenzoyldiphenylphosphine oxide |
| GENORAD 16 | Proprietary inhibitor |
| TEGOFLOW 370 | Polyacrylate additive/flow promoter |
| BYK A-535 | Proprietary defoamer (acrylic polymer) |
| UV VIOLET TONER | 0.1% Pigment Violet 23 dispersion in 5EOPTTA |

**PI = Photoinitiator

Examples of 3-Ethoxy-trimethylolpropane triacylate include: TMPEOTA, Cytec Surface Specialties; Photomer 4149, IGM Resins; EM2380, Eternal Chemical Co.; Miramer 3130, Miwon Specialty Chemical Co.; and SR454, Sartomer Company. Examples of Polyethyleneglycol (200) diacrylate include: Photomer 4050, IGM Resins; EM224 Eternal Chemical Co.; Miramer 282, Miwon Specialty Chemical Co.; and SR259, Sartomer Company. Examples of 2-Propoxyneopentylglycol diacrylate include: Photomer 4127, IGM Resins; EM2251 Eternal Chemical Co.; Miramer M216, Miwon Specialty Chemical Co.; and SR9003, Sartomer Company. Examples of Polyacrylate flow and leveling additive include: Tego Flow 425, Tego Flow 300, Tego Flow 370, and Tego Wet 270, Evonik Industries; and BYK 361-N, and BYK 3455; BYK USA Inc. Examples of Polymeric defoamer/deaerator additive include: BYK-A 535, BYK USA Inc.; and Tego Airex 920, Evonik Industries.

Addition of appropriate low odor, low migration, and commercially available free-radical photoinitiators and photosynergists can convert these examples to equally effective UV curable primer coatings. Examples of such free-radical photoinitiators and photosynergists include: Irgacure 127, BASF Corp.; Omnipol Series, IGM Resins; Speedcure 7000 Series, Lambson Ltd.; Genopol Series, Rahn USA Corp.; and CN3715LM, Sartomer Company.

The following Table 4 illustrates physical properties of a partial list of preferred monomers and oligomers for use in the primers of the present invention. Table 4 discloses only a partial list, and any other material exhibiting the expressed favorable characteristics of surface energy, gloss retention, and viscosity decrease during heating would also be preferred. Functionality density has been calculated based on the theoretical structure of the monomer/oligomer material assuming 100% purity.

In practical applications of low odor formulations, the primer would be overcoated with inks and overprint varnish or lacquer, and be expected to demonstrate <10 ppb offset migration based on testing protocols using Tenax food stimulant following European Commission regulation EU 10-2011.

TABLE 4

Physical properties of a partial list of preferred monomers and oligomers for use in the primers of the present invention

| Material | M.W.[1] | C—O—C[2]/ mole | C—O—C meq/g | C=C/ mole | C=C meq/g | C=O/ mole | C=O meq/g | R.I.[1] | Viscosity[1] cPs, 25° C. |
|---|---|---|---|---|---|---|---|---|---|
| 5EO-PETTA | 528 | 9 | 17.05 | 4 | 7.58 | 4 | 7.58 | 1.4711 | 150 |
| 3EO-TMPTA | 428 | 6 | 14.02 | 3 | 7.01 | 3 | 7.01 | 1.4689 | 60 |
| GPTA | 480 | 6 | 12.50 | 3 | 6.25 | 3 | 6.25 | 1.4605 | 95 |
| 2PO-NPGDA | 328 | 4 | 12.20 | 2 | 6.10 | 3 | 9.15 | 1.4464 | 15 |
| PEG200DA | 302 | 7 | 23.18 | 2 | 6.62 | 2 | 6.62 | 1.4639 | 25 |
| HDDA | 226 | 2 | 8.85 | 2 | 8.85 | 2 | 8.85 | 1.456 | 10 |
| TPGDA | 258 | 4 | 15.50 | 2 | 7.75 | 2 | 7.75 | 1.4606 | 15 |
| DPGDA | 242 | 3 | 12.40 | 2 | 8.26 | 2 | 8.26 | 1.4502 | 10 |
| 2EO-BPADA | 512 | 4 | 7.81 | 2 | 3.91 | 2 | 3.91 | 1.534 | 1400 |
| PHOTOMER 5006 | 650 | 6 | 9.231 | 1 | 1.54 | 3 | 9.55 | | 70 |

[1]Molecular weight, refractive index (R.I.) and Viscosity are from supplier data.
[2]Calculated molar composition and milliequivalent/gram (meq/g).

For reference, representative samples of unprinted Met-Pol and Transmet board were obtained as illustrated in Table 5.

TABLE 5

| Parameter | Met-Pol board | Transmet board |
|---|---|---|
| $Y_{SCI}$ | ~83 | ~83 |
| Brilliance Index | ~90% | ~96% |

Brilliance Index Test Method

Total visible light reflectance (Y) and Brilliance Index were measured using an X-Rite XP-64 sphere spectrophotometer using a 4 mm aperture setting. Measurements were taken according to ASTM E313-98 in both specular component included (SCI) and specular component excluded (SCE) modes. The brilliance index which indicates how metallic the sample appears based on the degree of specular light reflection was calculated from the following equation:

Brilliance Index (%)=$[Y_{SCI}-Y_{SCE}]/Y_{SCI}*100$

UV and EB primers of this invention preferably have a characteristic temperature viscosity dependency showing much larger reduction in viscosity between 25° C. (ambient room temperature) and 45° C. (typical maximum application temperature). These formulations provide higher gloss, total visible light reflectance, and brilliance index compared with prior art metallization undercoat/primer in US2007/076069 (Examples 6-8). Examples 1 and 2 illustrate gravure printable EB formulations of the present invention with monomers and oligomers having individual molecular weight >300 grams per mole for odor and taste sensitive packaging applications. Example 3 illustrates a gravure printable EB formula which is not preferred for odor and taste sensitive packaging. Examples 4 and 5 illustrate gravure printable UV formulations of the present invention with monomers and oligomers having individual molecular weight >300 grams per mole for odor and taste sensitive packaging applications. Example 9 is an example of flexographic printable formulation of the present invention with low odor characteristics.

Gloss Results

Several UV primer formulations were applied using a TMI UV Flexiproofer 100 onto BYK Penopac charts 2817. The charts had white coated and uncoated regions. Gloss 60° was measured using a BYK-Gardner micro-TRI-gloss meter over both areas. The samples were cured with a UV lamp intensity at 100 W/in at a speed of 200 fpm.

TABLE 6

Gloss results of primer formulations

| | Ex. 4 | Ex. 6 | Ex. 7 | Ex. 8 |
|---|---|---|---|---|
| BYK Penopac White Coated Area | | | | |
| Gloss 60° results | | | | |
| 15 BCM | 91.9 | 92.9 | 91.3 | 90.6 |
| 10 BCM | 91.7 | 90.2 | 88.9 | 90.0 |
| 5 BCM | 85.02 | 56.70 | 56.95 | 84.40 |
| Gloss 20° results | | | | |
| 15 BCM | 62.1 | 70.0 | 70.0 | 68.9 |
| 10 BCM | 66.0 | 64.0 | 61.2 | 64.6 |
| 5 BCM | 49.4 | 21.4 | 23.6 | 48.2 |
| BYK Penopac White Uncoated Area | | | | |
| Gloss 60° results | | | | |
| 15 BCM | 91.2 | 54.7 | 63.0 | 89.6 |
| 10 BCM | 88.9 | 32.5 | 39.3 | 87.2 |
| 5 BCM | 73.5 | 25.6 | 25.1 | 63.5 |
| Gloss 20° results | | | | |
| 15 BCM | 62.7 | 25.2 | 34.4 | 59.9 |
| 10 BCM | 52.7 | 11.2 | 13.8 | 52.7 |
| 5 BCM | 30.6 | 4.5 | 4.2 | 22.3 |

The results show the superior gloss retention of an example of primer from of the present invention (Example 4) compared with the primer from the prior art (Example 6) and variants of the Example 6 formulation (Examples 7 and 8) using the same photoinitiator and photoinitiator level as Example 4 and also a flow additive. The additional results show that by substituting the photoinitiator and introducing a flow additive to match the additive package from Example 4, the 60° gloss retention on Penopac chart 2817 is greatly improved looking at both the retention on the white coated area as well as the difference in gloss between the coated and uncoated area.

These examples shows that the coating formulation and in particular the additive package can be selected such that the cured coating exhibits superior gloss retention over a range of anilox volumes from 15 to 5 bcm when printed onto BYK Penopac 2817 charts. Superior gloss retention is defined as a gloss 60° reduction of less than 10 points and a gloss 20° reduction of less than 20 points when changing from 15 bcm to 5 bcm anilox. One example of a suitable additive package includes polyacrylate flow promoters such as Tego 370, but other suitable flow additives could be used. Furthermore, the additive package can also help provide more robust gloss performance over coated and uncoated board as illustrated by gloss differences between the cured coating over white coated area of the BYK Penopac 2817 chart compared with cured coating over the white uncoated area of the chart. Preferred compositions show a gloss 60 difference of less than 2 at 15 bcm and less than 4 at 10 bcm.

Typically the UV or EB primer is applied as the first layer on the substrate, followed by metallic silver and other inks. In some practical applications, there may be a need for UV or EB primers to be applied over dried inks without re-wetting or dissolving the inks disrupting the image quality of printed graphics. Example 2 is an example of a primer comprising a monomer and oligomer composition having low solvency for nitrocellulose based gravure inks. A practical test for primer-ink compatibility involves applying a droplet of primer onto the surface of dry ink, wiping the excess fluid after several minutes, and assessing the degree of ink removal either visually or using optical density measurement. Example 2 shows minimal re-solvency of nitrocellulose ink over a period of several minutes wet contact and superior performance to Example 1 in this regard.

In order to illustrate the ability to use the primer of the present invention in applications other than paperboard substrates, Example 4 was applied with 15 BCM anilox roll onto thin paper substrates <70 grams per square meter typically used for beer and beverage bottle labels. Once over-printed with SC17604 silver ink using a Meyer #3 bar, the label demonstrates comparable metallic brilliance to vacuum metalized paper substrate.

All references cited herein are herein incorporated by reference in their entirety for all purposes.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

We claim:

1. A printed article comprising:
    a primer composition comprising:
        (a) an acrylic monomer comprising C—O—C and C=C functional groups; and
        (b) an acrylic oligomer comprising C—O—C and C=C functional groups;
    wherein the composition is essentially solvent-free; and
    wherein, said primer composition is energy curable and the calculated ratio of C—O—C to C=C functionality in the sum of the acrylic monomer and acrylic oligomer is greater than 1.6.

2. The printed article of claim 1 overprinted with a reflective metallic ink on at least a portion of the cured primer layer.

3. A packaging comprising the article of claim 1.

* * * * *